Nov. 13, 1934.  A. N. GRAY  1,980,197
METHOD OF SEALING CONDUCTORS IN PLATES
Filed April 6, 1932  2 Sheets-Sheet 1
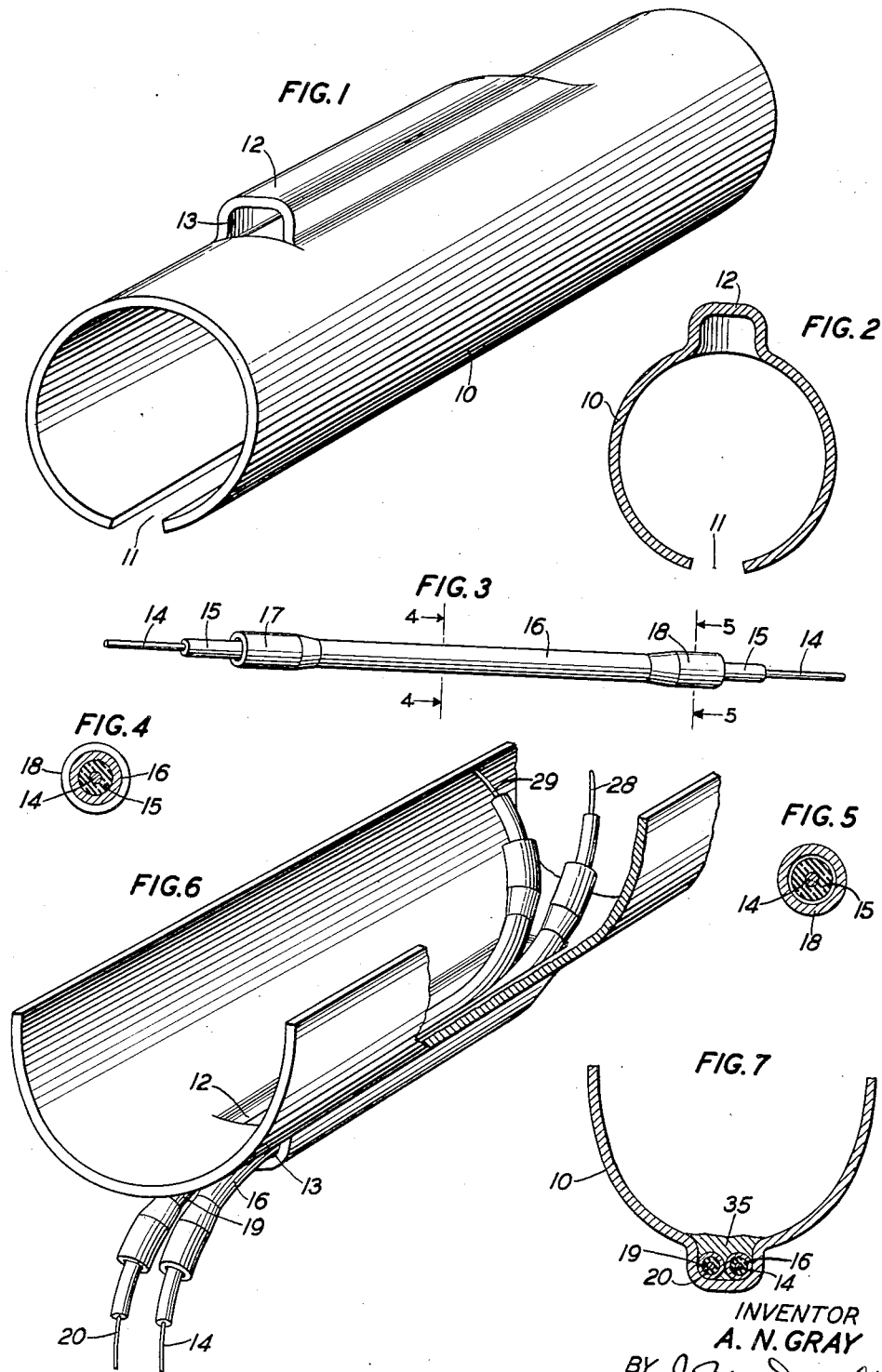
INVENTOR
A. N. GRAY
BY J. MacDonald
ATTORNEY Nov. 13, 1934.   A. N. GRAY   1,980,197
METHOD OF SEALING CONDUCTORS IN PLATES
Filed April 6, 1932   2 Sheets-Sheet 2
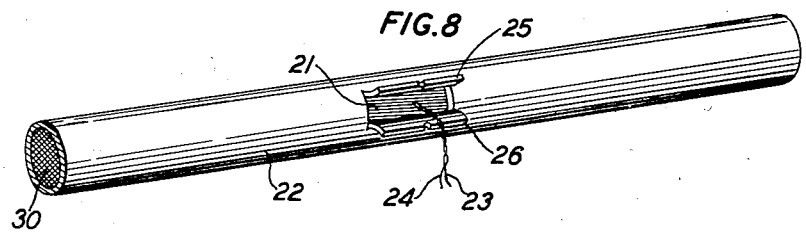
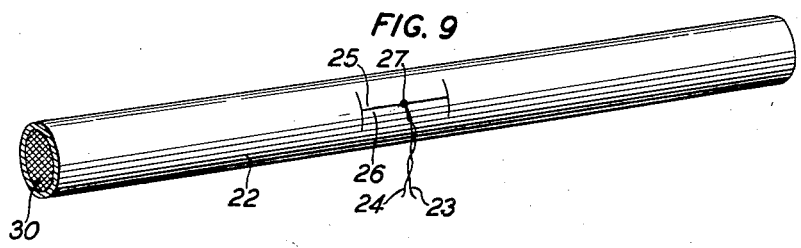
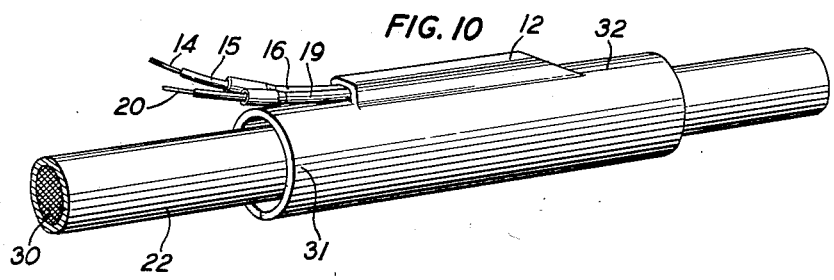
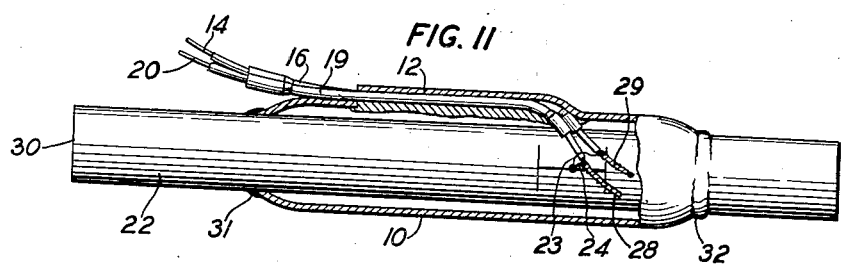
INVENTOR
A. N. GRAY
BY J. MacDonald
ATTORNEY Patented Nov. 13, 1934

1,980,197

UNITED STATES PATENT OFFICE 1,980,197

METHOD OF SEALING CONDUCTORS IN PLATES

Alvin N. Gray, Baltimore, Md., assignor to Bell Telephone Laboratories, Incorporated, New York, N. Y., a corporation of New York Application April 6, 1932, Serial No. 603,520

6 Claims. (Cl. 173—268)

This invention relates to a method of sealing leading-out wires or conductors in a metallic plate or the like.

The object of the present invention is to provide a means whereby leading-out wires or conductors may pass through a metallic wall in such a manner that a gas and moisture-proof seal is made between the wires and the metallic wall.

Heretofore it has been the practice in passing wires through a metallic wall for connection to other wires, to pass the conductors through apertures in the plate and put a sealing compound or rubber bushing around the wires at the point of passage. This practice is open to the objection that it is not moisture-proof inasmuch as the conductors at this point are subject to a considerable amount of movement. This together with the fact that the sealing compound or rubber bushing deteriorates very rapidly, tends to cause leakage at this point.

The present invention contemplates the use of a metallic tube, one for each wire that is to be passed through the plate. The metallic tube is sealed to the metallic plate in such a manner that it is moisture and gas tight. Located inside of the metallic tube and securely held therein is a rubber-covered wire which is sealed in the metallic tube in such a manner that it is also moisture and gas tight.

One application of the present invention, which will hereinafter be described in detail, is the bringing out of a pair of lead-out wires from a lead-covered cable where it is desired to connect a subscriber's line to a pair of conductors in the cable, this pair of conductors being the only one to be brought out at this particular point.

Heretofore it has been customary in bringing leading-out wires from a lead-covered cable for connection to drop wires or the like, to open up the cable sheath at the point where the wires are to be brought out and spliced to the desired wires a short length of cable, this cable being attached to a terminal box the ends of the conductors in the cable being sealed by a compound as they enter the box, the box in turn being secured to a support adjacent the cable sheath. The connections are then made from the line wires to the terminal box.

The above method of bringing out wires from cables and connecting them to line wires is an expensive one and is only warranted where a large number of wires are to be brought out. Where the number of conductors to be brought out is small, for example, making a mid-span subscriber's connection to a lead-covered cable where only one pair of conductors is to be brought out, it is readily apparent that the installation of a terminal box for the purpose of bringing out this pair of wires is not warranted.

The present invention as applied to the connecting of a subscriber's line to a pair of conductors in a lead-covered cable utilizes a split sleeve of a diameter sufficient to encircle the cable and provide a space between the outside of the cable sheath and the inside of the sleeve for the wire joint. Located in the sleeve diametrically opposite the split is a metallic tube one for each wire to be brought out. The metallic tube is sealed to the sleeve in such a manner that it is moisture and gas tight. Located inside of the metallic tube and securely sealed therein is a rubber-covered leading-out wire. This wire is sealed in the metal tube in such a manner that it is also moisture and gas tight. The ends of the wire on the interior of the sleeve are connected to the wires of the cable and the sleeve is secured to the cable sheath in the usual manner. The outer ends of the leading-out wires are then joined to the subscriber's line.

Referring now to the drawings, Fig. 1 is a view in perspective of the split sleeve;

Fig. 2 is a cross-sectional view of Fig. 1;

Fig. 3 is a view of the metallic sleeve with the rubber-covered wire secured therein;

Fig. 4 is a cross-sectional view of Fig. 3 taken on the line 4—4;

Fig. 5 is a cross-sectional view of Fig. 3 taken at the line 5—5;

Fig. 6 is a perspective view with a portion broken away to illustrate the manner in which the metal tubes are secured on the interior of the split sleeve;

Fig. 7 is a cross-sectional view of Fig. 6;

Fig. 8 is a perspective view of a lead-covered cable which has been opened up to permit a connection to a pair of conductors;

Fig. 9 is a view similar to Fig. 8 but the pair of conductors are brought out and the incision in the lead-covered cable put back in place;

Fig. 10 is a view in perspective of the lead-covered cable with the split sleeve with the leading-out wires projecting therefrom placed in position around the lead-covered cable; and Fig. 11 is a partial cross-sectional view of the finished connection which illustrates the leading-out wires connected to the conductors of the cable and the split lead sleeve securely fastened around the lead-covered cable.

Referring now to Figs. 1 and 2, applicant's invention in its preferred form consists of an elongated metal sleeve 10 of substantially circular cross-section, the wall of which is split longitudinally at the point 11, said split extending the entire length of the sleeve 10.

Located on the wall of the sleeve 10 and opposite the split 11 is a pocket or depression 12, said pocket being formed integral with the wall of the sleeve 10 and extending for some distance along the sleeve. The pocket 12 is formed by means of suitable tools (not shown) which force the material into a die to form an elongated depression which is open at one end only.

The depression or pocket 12 is provided with an open end 13 and is of a size sufficient to accommodate the number of wires it is desired to bring out from the lead-covered cable. The leading-out wires are secured in the pocket 12 in the following manner. As shown in Fig. 3 the leading-out wire 14 is provided with a suitable rubber covering 15 which is of very high grade and which will retain its resiliency over a long period of time. The rubber-covered wire 14 is inserted into a short length of metallic tubing 16 which is of such a diameter that a push fit is obtained. After the wire 14 is in position in the tubing 16 and extending a suitable distance beyond the tubing on each end, the metal tubing is forced down into intimate contact with the rubber covering on the wire thus placing the rubber inside of the tubing under compression, thereby forming an air and moisture-proof seal between the rubber-covered wire and the metallic tube.

As shown in Figs. 3 and 5 the ends 17 and 18 of the tubing 16 are not forced down into contact with the rubber covering. This is done to prevent the bulging of the rubber at the end of the metal sleeve. It can be readily observed that if the metallic tube 16 were compressed along its entire length that the rubber at the end of the tube would be deformed and would allow moisture to seep in between the wire 14 and the rubber covering 15. Such deformation in exposed parts would also promote cracking of the rubber covering.

The leading-out wires after being secured in the metallic tubing as outlined above are placed in position in the pocket 12 which has been previously formed in the sleeve. As shown in Fig. 6 the metallic tubes 16 and 19 extend some distance beyond the opening 13 of the sleeve 10 while the opposite ends of the tubes project some distance above the surface on the interior of the sleeve. After the metallic tubes 16 and 19 with their enclosed wires 14 and 20 have been placed in the pocket 12 molten lead is poured into the pocket until the level of the molten lead is even with the surface of the sleeve 10.

As shown in Fig. 7 the tubes 16 and 19 are completely covered with the lead 35 and an air and moisture-proof seal is obtained between the metal tubes 16 and 19 and the metal sleeve 10. From the foregoing description it is readily apparent that by a novel arrangement the applicant has provided a means whereby an insulated wire may pass through a metallic wall, be effectively insulated therefrom, and yet be moisture and air tight.

Applicant's invention is not limited to the specific details shown but may be readily applied to any structure where it is desired to pass a wire through a metallic wall, keep it insulated therefrom and allow no moisture or air to enter where the wire passes through the wall.

As pointed out applicant first effectively seals the wire in a metallic tube and then seals the tube in the wall of the sleeve.

When using applicant's method for bringing leading-out wires from a lead-covered cable it is only necessary, as shown in Fig. 8, to make a small incision 21 in the sheath 22 of the cable 30. This allows access to the conductors in the cable. When the desired conductors have been located they are brought out as indicated by the reference characters 23 and 24 and the extending portions 25 and 26 of the cable sheath 22 folded back into the opening over the conductors as shown in Fig. 9.

As is shown in Fig. 9 conductors 23 and 24 pass through a small aperture 27 in the cable sheath and are now ready to be joined to the inner ends 28 and 29 of the leading-out wires 14 and 20. After the conductors 23 and 24 have been joined to the leading-out wires 14 and 20 and insulated from each other by tape or other suitable means, the split sleeve 10 is placed around the cable sheath 22 of the cable 30 as shown in Fig. 10. The split in the sleeve 10 is now closed by means of soldering or the like. The ends 31 and 32 of the sleeve are beaten down and soldered to the cable sheath in the well-known manner as shown in Fig. 11. The outer ends of the leading-out wires 14 and 19 may then be connected to the subscriber's line in the usual manner.

What is claimed is:

1. A means for connecting wires in a cable to other wires, which comprises, a plate having a depression formed therein and an opening in said depression, tubes passing through said opening and extending some distance on either side of said plate, said tubes sealed to said plate by means of a compound which fills up said depression and wires passing through said tubes and sealed therein.

2. A means for connecting wires in a cable to other wires, which comprises, a metallic plate having a depression formed therein and an opening in said depression, metallic tubes passing through said opening and extending some distance on either side of said plate, said tubes sealed to said plate by means of a material which fills up said depression and wires passing through said tubes and sealed therein.

3. Means for bringing out individual conductors from a cable comprising insulated wires having a covering pressed tightly onto the insulation to exclude moisture, a member, the conductors so constituted projecting through an opening in said member, one end of each conductor being spliced to a cable conductor led out through the cable sheath and the other end projecting from the member for connection to the external circuit, the conductors being sealed in the opening in said member and the member being sealed to the cable sheath.

4. Means for bringing out wires from a lead covered cable comprising a lead sleeve having an opening therein through which project wires, each wire being covered with insulation and a metallic tube pressed tightly thereon, and material flowed around said metal tubes for sealing them in said opening, the sleeve encircling the cable and being sealed thereto at each end.

5. Means for bringing out wires from a lead covered cable comprising rubber covered wires, a lead sleeve having a pocket struck up from the sleeve and opening externally and into the sleeve, each of said wires having a metallic tube pressed tightly over the rubber covering and being led from one side of said sleeve to the other through said pocket, the pocket being filled with solder and the sleeve soldered to the cable sheath.

6. A joint between conductors brought out of a lead covered cable comprising a slit in the cable sheath, a member having a pocket therein enclosing said slit and sealed thereover, metallic tubes passing through said pocket, a compound in said pocket for sealing said tubes therein, and insulated conductors sealed in said tubes and spliced to cable conductors leading out of said slit.

ALVIN N. GRAY.